United States Patent
Zech et al.

(10) Patent No.: US 10,421,365 B2
(45) Date of Patent: Sep. 24, 2019

(54) ELECTRIC CHARGING OF ELECTRIC VEHICLES BY ADAPTER FOR SIGNAL CONVERSION

(71) Applicant: VOLKSWAGEN AG, Wolfsburg (DE)

(72) Inventors: Ingo Zech, Wendeburg (DE); Andreas Wegener, Peine (DE)

(73) Assignee: Volkswagen AG (DE)

(*) Notice: Subject to any disclaimer, the term of this patent is extended or adjusted under 35 U.S.C. 154(b) by 159 days.

(21) Appl. No.: 15/629,796

(22) Filed: Jun. 22, 2017

(65) Prior Publication Data

US 2017/0368953 A1 Dec. 28, 2017

(30) Foreign Application Priority Data

Jun. 24, 2016 (DE) .................. 10 2016 211 335

(51) Int. Cl.
| | |
|---|---|
| *B60L 53/16* | (2019.01) |
| *B60L 11/18* | (2006.01) |
| *H01R 31/06* | (2006.01) |
| *H04L 12/40* | (2006.01) |
| *H02J 7/00* | (2006.01) |
| *B60L 53/60* | (2019.01) |

(52) U.S. Cl.
CPC ........... *B60L 11/1818* (2013.01); *B60L 53/16* (2019.02); *B60L 53/60* (2019.02); *H01R 31/065* (2013.01); *H02J 7/00* (2013.01); *H04L 12/40013* (2013.01); *H01R 2201/26* (2013.01); *H04L 2012/40215* (2013.01); *H04L 2012/40273* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01)

(58) Field of Classification Search
CPC .................................. H02J 7/00; B60L 53/16
USPC .......................................................... 320/104
See application file for complete search history.

(56) References Cited

U.S. PATENT DOCUMENTS

| | | |
|---|---|---|
| 2013/0214738 A1 | 8/2013 | Chen et al. |
| 2014/0266042 A1 | 9/2014 | Storm |
| 2015/0137755 A1 | 5/2015 | Sadano et al. |
| 2015/0224890 A1 | 8/2015 | Kim et al. |

(Continued)

FOREIGN PATENT DOCUMENTS

| | | |
|---|---|---|
| CN | 104578291 A | 4/2015 |
| DE | 102013112845 A1 | 5/2015 |

(Continued)

OTHER PUBLICATIONS

CHAdeMO, Nissan and Volkswagen align on promoting multi-standard Fast Chargers to accelerate infrastructure deployment and EV adoption; 2013 World EV Summit; Norway; 2013.

(Continued)

*Primary Examiner* — Edward Tso
*Assistant Examiner* — Ahmed H Omar
(74) *Attorney, Agent, or Firm* — Barnes & Thornburg LLP

(57) ABSTRACT

An adapter having a CHAdeMO socket on its input side for receiving a charging station connector of a CHAdeMO charging station, a CCS connector on its output side for connection to an electric vehicle, and an electronic circuit logic which embeds signal states entering via the CHAdeMO socket into a CAN message and to provide them as an output signal.

20 Claims, 11 Drawing Sheets

(56) References Cited

U.S. PATENT DOCUMENTS

| | | | |
|---|---|---|---|
| 2016/0036256 A1* | 2/2016 | Sukup | H02J 7/0052 320/107 |
| 2016/0144728 A1* | 5/2016 | Harper | B60L 11/1803 320/109 |
| 2018/0370378 A1* | 12/2018 | Konishi | B60L 11/18 |

FOREIGN PATENT DOCUMENTS

| | | |
|---|---|---|
| DE | 112013006901 T5 | 12/2015 |
| DE | 102014109939 A1 | 1/2016 |
| EP | 2628630 A2 | 8/2013 |
| EP | 2897246 A1 | 7/2015 |
| JP | 2014124033 A | 7/2014 |
| JP | 2015020579 A | 2/2015 |
| JP | 2015220788 A | 12/2015 |
| KR | 20150107121 A | 9/2015 |
| WO | 2013062453 A1 | 5/2013 |
| WO | 2014163618 A1 | 10/2014 |

OTHER PUBLICATIONS

Search Report for German Patent Application No. 10 2016 211 335.6; dated Dec. 27, 2016.

\* cited by examiner

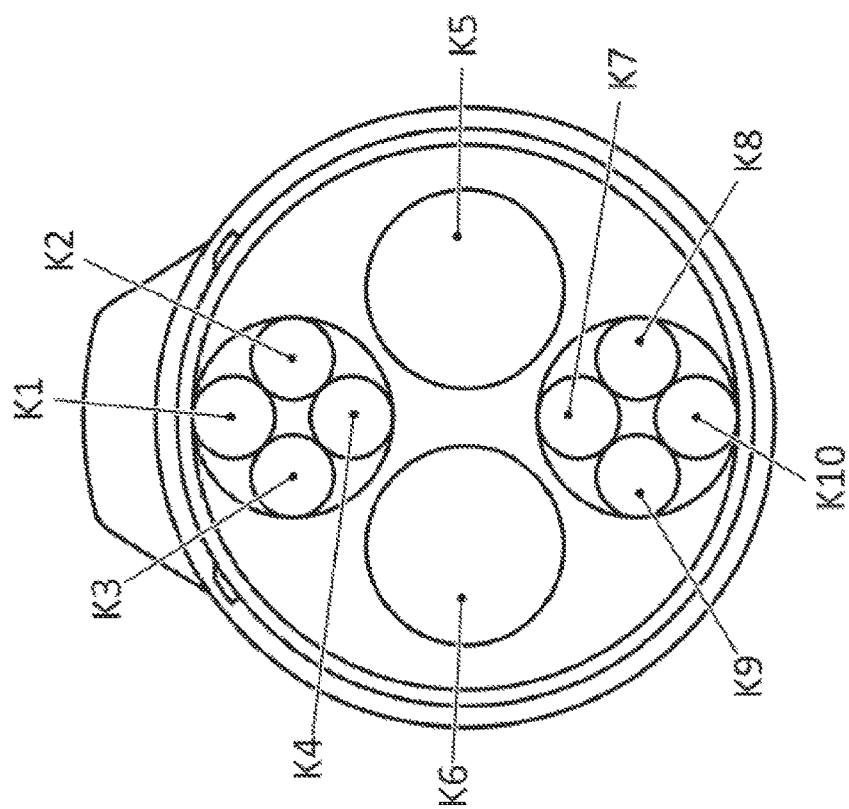

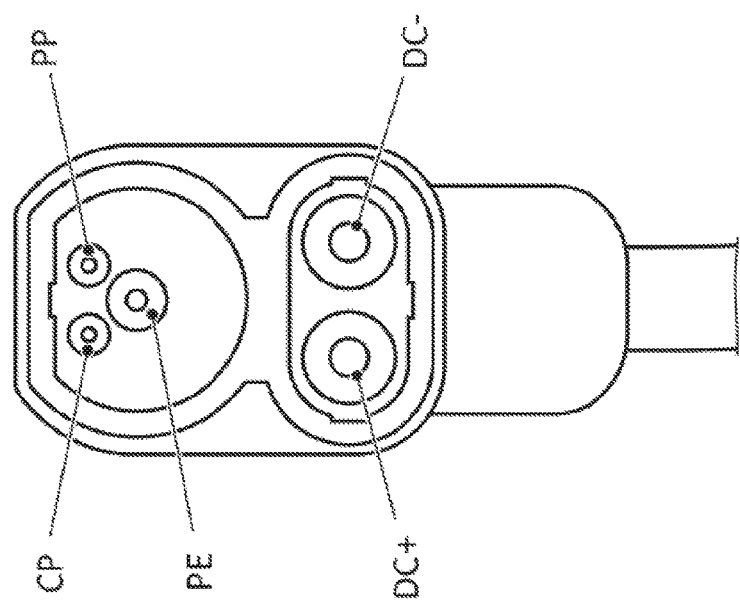

ELECTRIC CHARGING OF ELECTRIC VEHICLES BY ADAPTER FOR SIGNAL CONVERSION

PRIORITY CLAIM

This patent application claims priority to German Patent Application No. 10 2016 211 335.6, filed 24 Jun. 2016, the disclosure of which is incorporated herein by reference in its entirety.

SUMMARY

Illustrative embodiments relate to the field of charging systems and interfaces for electric vehicles.

BRIEF DESCRIPTION OF THE DRAWINGS

Exemplary embodiments will now be described by way of example and with reference to the attached drawings, in which:

FIG. 5a shows the connections of the CHAdeMO socket of an exemplary CHAdeMO-CCS adapter in a top view;

FIG. 5b shows the connections of the CCS connector of an exemplary CHAdeMO-CCS adapter in a top view;

DETAILED DESCRIPTION

Figure 1:
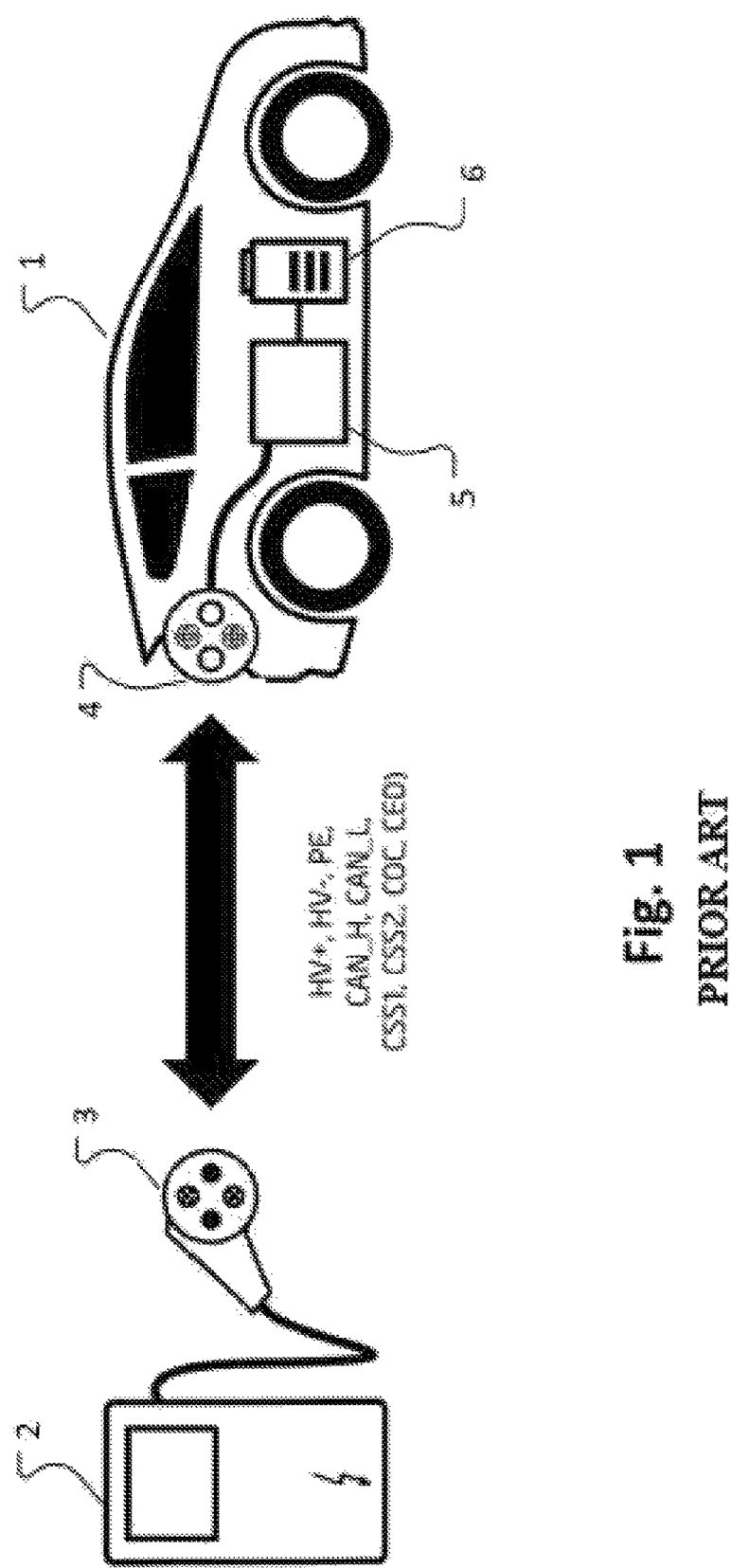
FIG. 1 shows an electric vehicle 1 at a CHAdeMO charging station according to the CHAdeMO charging technique already known.

Throughout the world, the most varied charging systems and interfaces are used which are not compatible with one another. Apart from the various possibilities of charging an electric vehicle using alternating or direct current, in addition to various connector standards for the USA, Europe and China in variants for alternating current and alternating current/direct current and the CHAdeMO standard there are around the world also OEM-specific connector solutions. Due to various technical conditions such as, e.g., voltage level, missing supply voltage, protocol characteristics, complexity or costs of expenditure, an adaptation of the systems is not possible in a simple manner. Due to the size of the socket systems or the restricted available installation space and the cost situation, installing various charging system interfaces in parallel at the vehicle is disregarded.

The CHAdeMO charging plug-in system is based on direct voltage (DC) and supports an electrical charging power of up to 62.5 kW. The CHAdeMO charging communication takes place via the CAN protocol and takes place via two CAN lines and separate signal lines. In the CHAdeMO protocol, the battery management system of the car is linked to the computer of the fast charging station to form a master-slave system. The battery management system of the car (master) reports to the charging station (slave) charging parameters such as the current state of charge of a traction battery and the direct voltage and maximum current intensity with which the traction battery is allowed to be charged. Furthermore, parameters such as voltage, temperature and other parameters of the traction battery are transmitted. The CHAdeMO protocol is recognized within a ISO standardization as the direct-current charging standard and has been incorporated as standards ISO/IEC 61851-23 and ISO/IEC 61851-24.

The combined charging system (CCS) is a charging plug-in system for electric vehicles which supports both the alternating-current charging (AC) and the direct-current charging (DC). CCS is standardized in accordance with the IEC 62196 international standard and is valid in Germany as DIN standard DIN EN 62196. IEC 61851-1 "Mode 3" provides a fast charge up to 250 A. IEC 61851-1 "Mode 4" supports a fast charge up to 400 A with control by an external charger. The connector of type 2 standardized according to IEC 62196-2:2011 is used, for example, as the charging connector and socket. In future, the type 2 connector is to be used in combination with Mode 3 as a uniform solution in the EU and also to be used for fast direct-current charging, such as the Combo2 connector (according to IEC 62196-3: 2014). The charging communication takes place via pulse width modulation of a rectangular oscillation in the case of CCS. For the fast charge, this communication technique is extended by an interface based on digital powerline communication (PLC).

There is also an adapter solution of CHAdeMO to the OEM charging system of TESLA vehicles. However, this adapter solution establishes the connection only to the TESLA-specific charging system.

From European patent application EP 2 628 630 A2, a multi-standard-compatible charging device for electric vehicles is known in which a transmission device communicates with a battery management system via an external protocol and with a power convertor via an internal protocol.

However, converting the CHAdeMO-CAN protocol to the CCS-"powerline" protocol and establishing the electrical boundary conditions is complex and time-critical.

Disclosed embodiments provide a charging system which overcomes the drawbacks mentioned above at least partially.

Disclosed embodiments provide an adapter, an additional controller, and a charging system.

In the text which follows, exemplary methods and technology for the electrical charging of electric vehicles having a charging connection socket according to the CCS standard ("combined charging system") and charging manager with CHAdeMO capability at CHAdeMO charging stations using adapters for signal conversion are described. Apart from the incompatibility of the signals of CHAdeMO and CCS, the disclosed embodiments address the problems of transmitting information from a total of six CHAdeMO-side input lines via only two signal lines available on the CCS-side.

Disclosed embodiments relate to an adapter having a CHAdeMO socket on its input side for receiving a charging station connector of a CHAdeMO charging station, a CCS connector on its output side for connection to an electric vehicle, and an electronic circuit logic which is designed to embed signal states entering via the CHAdeMO socket into a CAN message and to provide them as an output signal.

Such a "CHAdeMO-CCS" adapter can be utilized, for example, for electric vehicles having the European CCS charging interface which, using the adapter and an additional controller which is to be mounted in front of the charging manager in the electric vehicle, allows a battery of the electric vehicle, e.g., the traction battery, to be charged up at CHAdeMO charging stations.

The circuit electronics of the adapter can be designed, for example, in such a manner that the embedding of the signal states into a CAN message takes place, for example, in fixed time intervals and/or in the case of a detected change in the input signal.

The circuit logic of the adapter can also be designed to forward a CAN message occurring in the communication during a charging process from the CHAdeMO charging station or from a charging manager of the electric vehicle unchanged to the respective end station.

The adapter can also be designed to send the CAN message to an additional controller, connected in front of a charging manager in the electric vehicle.

In a disclosed embodiment, the charging manager of the electric vehicle manages both the CCS protocol and the CHAdeMO protocol. Thus, the charging manager can correctly interpret a CAN message forwarded to it unchanged from the CHAdeMO-CCS adapter.

In a disclosed embodiment, the CCS lines Control Pilot (CP) and Proximity Pilot (PP) are used as CAN-HIGH and CAN-LOW for transmitting the CAN message to an electric vehicle.

In a further disclosed embodiment, the HV supply voltage lines (HV+, HV−) are connected through directly in the adapter.

In a further disclosed embodiment, the functional protective earth is connected through and the functional protective earth is used as reference potential for the communication.

Disclosed embodiments also relate to an additional controller which is designed to be connected between a CCS charging socket of an electric vehicle and a charging manager of the electric vehicle, wherein the additional controller has a circuit logic which is designed to convert a CAN message received from a circuit logic of a CHAdeMO-CCS adapter into electrical signals and to provide them to for the charging manager of the electric vehicle.

The additional controller can be designed, for example, to be connected directly into the line trunk preceding the charging manager in the electric vehicle. For example, the additional controller can be looped into the line trunk in a similar manner to an extension line. No changes to the line trunk are required.

In a disclosed embodiment, a combination of socket/connector, which is also used at the charge manager of the electric vehicle, is used at the additional controller.

The circuit logic of the additional controller can also be designed to convert the digital output signals of the charging manager into CAN messages and to send these to a circuit logic of the CHAdeMO-CCS adapter.

For example, the circuit logic of the additional controller can be designed to forward incoming CHAdeMO-CAN messages directly to the charging manager.

The circuit logic of the additional controller can also be designed to forward a CAN message occurring in the communication during a charging process from a CHAdeMO charging station or from the charging manager of the electric vehicle unchanged to the respective end station.

CAN messages arriving from the CHAdeMO side are thus forwarded unchanged to the vehicle side and CHAdeMO-CAN messages arriving from the vehicle side are also forwarded unchanged to the CHAdeMO charging station.

According to a disclosed embodiment, the additional controller is designed to be connected with the functional protective earth (PE), Control Pilot (CP) and Proximity Pilot (PP) lines via the line trunk at the CCS charging socket of the electric vehicle.

According to a further disclosed embodiment, the Control Pilot (CP) and Proximity Pilot (PP) lines are connected directly to the charging manager (5) via a separable connection. Thus, the circuit logic of the additional controller can interrupt, for example, the functional connection of Control Pilot (CP) and Proximity Pilot (PP) to the charging manager and build up the communication with the external CHAdeMO-CCS adapter if a CAN message is detected on the Control Pilot/Proximity Pilot (CP/PP) pair of lines by a CAN transceiver of the additional controller, also connected.

Disclosed embodiments also relate to a charging system comprising a CHAdeMO-CCS adapter as described above, and an additional controller connected in front of a charging manager in an electric vehicle as described above, wherein the circuit logic of the additional controller is designed to convert a CAN message received from the circuit logic of the CHAdeMO-CCS adapter into electrical signals and provide these to the charging manager of the electric vehicle.

In a disclosed embodiment, the charging manager of the electric vehicle manages both the CCS protocol and the CHAdeMO protocol. Thus, the charging manager can, on the one hand, correctly interpret the CCS messages of the CCS charging station if the electric vehicle is charged up at a CCS charging station and, on the other hand, correctly interpret the CHAdeMO messages of the CHAdeMO charging station if the electric vehicle is charged up at a CHAdeMO charging station using a CHAdeMO-CCS adapter.

Disclosed embodiments also relate to a charging method in which signal states which are received from a CHAdeMO charging station are embedded into a CAN message and forwarded, embedded in the CAN message, to an electric vehicle.

A distinct increase in the usefulness of (otherwise incompatible) charging points and thus availability of the electric vehicle can be achieved with little technical and financial expenditure. Dispensing with the additional installation of a CHAdeMO charging socket in the vehicle in combination with addition of the CHAdeMO-CCS adapter described here would also be conceivable.

FIG. 1 shows an electric vehicle 1 at a CHAdeMO charging station 2 according to the CHAdeMO charging technique already known. To connect the electric vehicle 1 to the CHAdeMO charging station 2, the CHAdeMO charging station 2 has a CHAdeMO connector 3 which is inserted into a CHAdeMO socket 4 of the electric vehicle 1. The electric vehicle 1 is also equipped with a charging manager 5 which is connected to the energy management 6 of the electric vehicle 1. The charging manager 5 is designed in this case to operate in accordance with the CHAdeMO protocol. Communication between charging station 2 and electric vehicle 1 takes place by a combination of state signaling actions and a 2-wire CAN communication.

Figure 2:
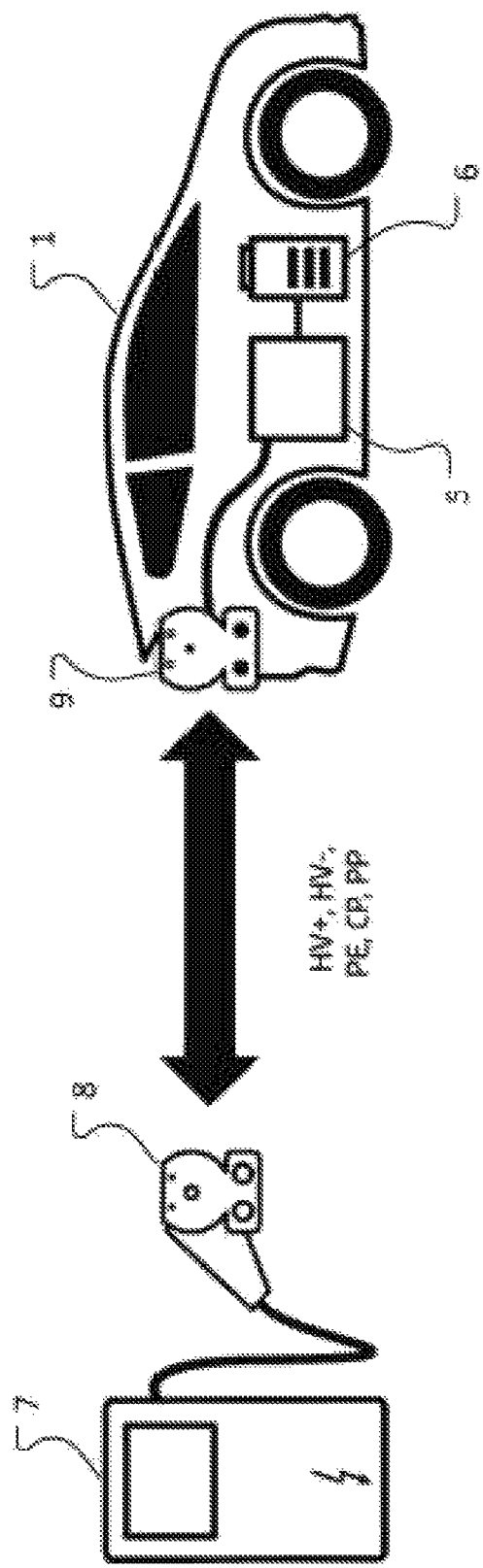
FIG. 2 shows an electric vehicle 1 at a CCS charging station according the CCS charging technique already known.

FIG. 2 shows an electric vehicle 1 at a CCS charging station 7 according to the CCS charging technique already known. To connect the electric vehicle 1 to the CCS charging station 7, the CCS charging station 7 has a CCS connector 8 which is inserted into a CCS socket 9 of the electric vehicle 1. The electric vehicle 1 is also equipped with a charging manager 5 which is connected to the energy management 6 of the electric vehicle 1. The charging manager 5 is in this case designed to operate in accordance with the CCS protocol.

Figure 3:
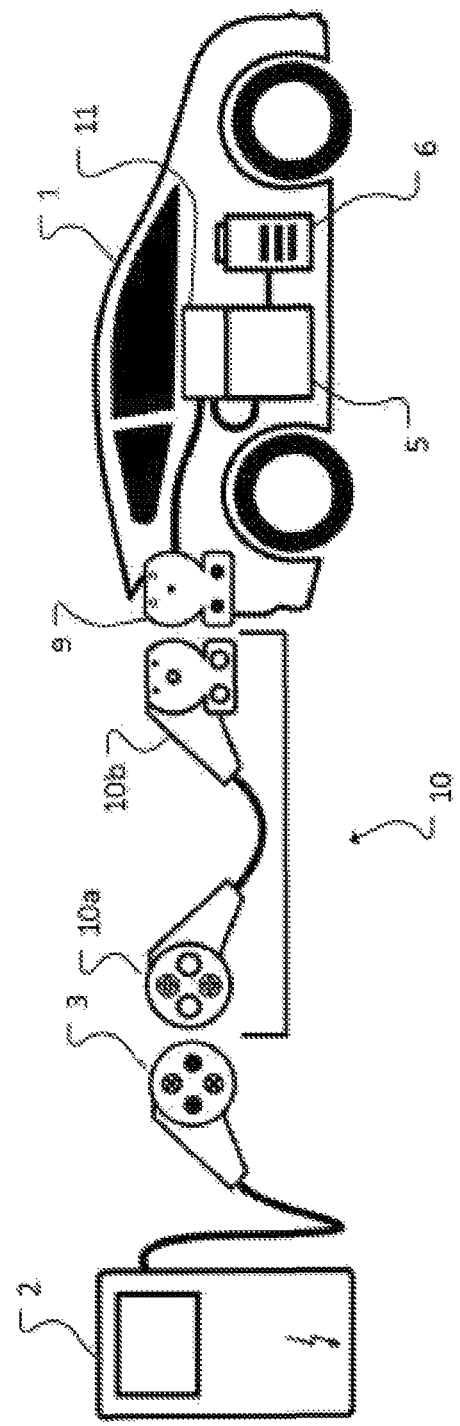
FIG. 3 shows a charging technique according to an exemplary embodiment.

FIG. 3 shows a charging technique according to an exemplary embodiment. An electric vehicle 1 is connected with a CCS charging interface (CCS socket 9) and an additional controller 11 using a CHAdeMO-CCS adapter 10 to a CHAdeMO charging station 2. The CHAdeMO-CCS adapter 10 comprises a CHAdeMO socket 10a into which the CHAdeMO connector 3 of the charging station 2 is inserted, and a CCS connector 10b which is inserted into the CCS socket 9 of the electric vehicle 1. In the adapter 10, the digital control signals are converted into CAN messages which are converted again into electrical signals by the additional controller 11 in the electric vehicle 1 and provided to the connected charging manager 5. The digital output signals of the charging manager 5 also experience a conversion into CAN messages which are sent by the additional controller 11 in the electric vehicle 1 to the other side in the CHAdeMO-CCS adapter 10. The CAN messages necessary for communication during the charging process from the charging station 2 and from the charging manager 5 of the electric vehicle 1, respectively, are forwarded both from the logic in the CHAdeMO-CCS adapter 10 and in the additional controller 11 of the electric vehicle 1 unchanged to the respective end station.

Figure 4:
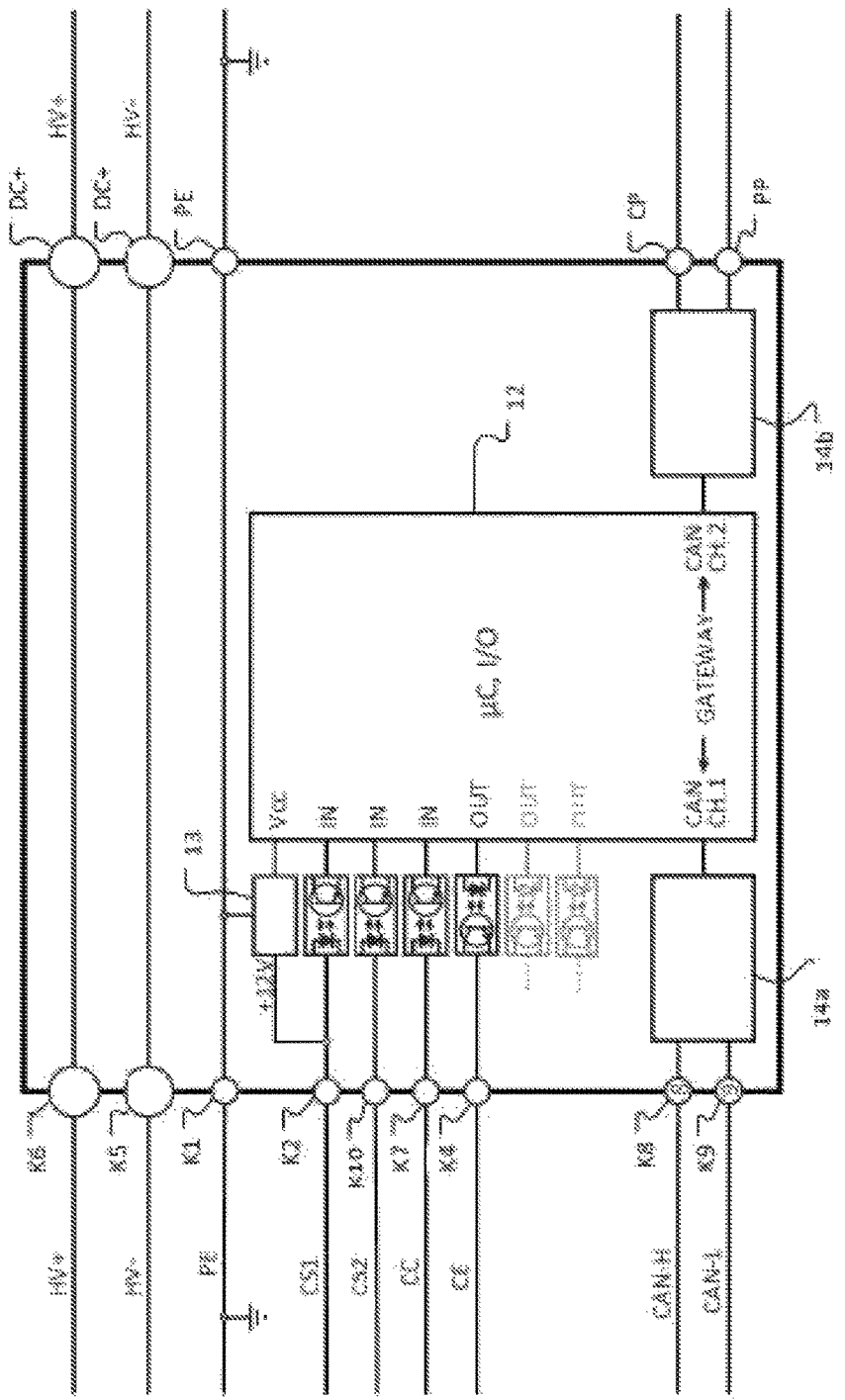
FIG. 4 shows an exemplary embodiment for the circuit configuration of a CHAdeMO-CCS adapter.

FIG. 4 shows an exemplary embodiment of the circuit configuration of a CHAdeMO-CCS adapter 10.

The left-hand side of the circuit of FIG. 4 represents the interface to the CHAdeMO charging station, i.e., the CHAdeMO socket of the adapter (10a in FIG. 3). The circuits numbered through from 1 to 10 represent the connections of the CHAdeMO socket of the adapter (a CHAdeMO socket has ten connections, the third connection not being occupied). Overall, nine connections or lines are provided: two lines for the energy transmission (HV+, HV−), a "functional" protective earth PE line, two CAN-H, CAN-L lines for digital communication and four other lines CS1, CS2, CC, CE for the signaling of digital status information (CS1=charger start/stop 1, CS2=charger start/stop 2, CC=connection check, CE=charging enabled/disabled). The digital control signals of the CHAdeMO charging station are forwarded to the microcontroller of the adapter using optocouplers.

The right-hand side of the circuit of FIG. 4 represents the interface to the electric vehicle 1, i.e., the CCS connector of the adapter (10b in FIG. 3). The circuits designated by DC+, DC−, PE, CP and PP represent the connections of the CCS connector of the adapter. A total of five connections or lines are provided for the connection to the electric vehicle: two lines for energy transmission (HV+, HV−), one line PE for the "functional" protective earth, one line for "connector detection" (PP, Proximity Pilot), and one other line for the signaling of digital status information (CP, Control Pilot). The CP line already occupied by a PWM signal according to the standard is additionally also used for a special form of "power line" communication via which data can be exchanged between the charging station and the electric vehicle 1.

According to the exemplary circuit of FIG. 4, the HV supply voltage lines HV+ and HV− and the "functional protective earth PE" are connected through directly. The CAN messages arriving from the CHAdeMO side via the CAN-H and CAN-L connections are forwarded unchanged to the vehicle side. The digital control signals of the CHAdeMO charging station (here CS1=charger start/stop 1, CS2=charger start/stop 2, CC=connection check, CE=charging enabled/disabled) are coupled to a microcontroller 12 of the adapter using optocouplers. In both fixed time intervals and in the case of a detected change of an input signal, these signal states are sent out, embedded in a CAN message, to the additional controller (11 in FIG. 3) in the electric vehicle 1. For the transmission of the CAN messages, the "CP—control pilot" and "PP—proximity" lines are "alienated" with "PE" as GND potential. Two CAN transceivers 14a,b (which, e.g., operate in accordance with ISO 11898-2,3) are used as interface for sending and receiving CAN messages. The circuit is supplied with operating voltage via the CHAdeMO charging station by the C-S/S-1 ("charger start/stop-1") connection, at which 12 V are present with the starting of the charging process at the charging station. A power supply 13 converts the 12 V of the charging station suitably for the microcontroller 12.

FIG. 5a shows the terminals of the CHAdeMO socket of an exemplary CHAdeMO-CCS adapter in a top view.

FIG. 5b shows the terminals of the CCS connector of an exemplary CHAdeMO-CCS adapter in a top view.

Figure 6:
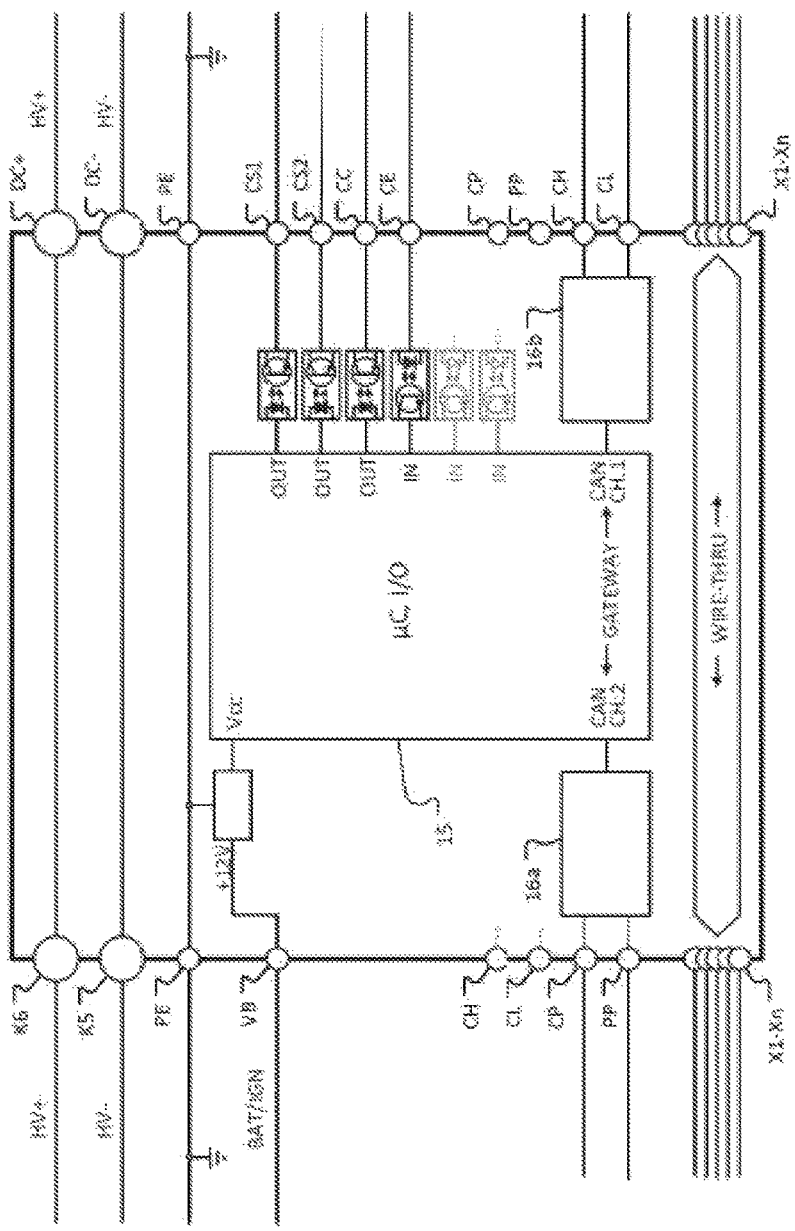
FIG. 6 shows the configuration of the additional controller CCS-CHAdeMO in the electric vehicle.

FIG. 6 shows the configuration of the additional controller CCS-CHAdeMO (11 in FIG. 3) in the electric vehicle. The HV supply voltage lines HV+ and HV− are directly connected through or connected directly to the charging manager (5 in FIG. 3) in the line trunk of the electric vehicle. The additional controller is connected directly in front of the charging manager with a combination of socket/connector (see FIG. 7a and FIG. 7b) which is also used at the charging manager. The additional controller can thus be retrofitted in a simple and cost effective manner without further technical changes to the vehicle or to the line trunk. At the input side (left-hand side in FIG. 6), the additional controller is connected to the vehicle charging socket only with the "PE", "CP" and "PP" lines. The protective earth "PE" is used as GND potential, the voltage supply BAT/IGN via terminal VB is carried out, for example, via the on-board system of the electric vehicle (e.g., vehicle terminal 30). The "CP—control pilot" and "PP—proximity" lines are connected directly to the charging manager via a separable connection (not shown in FIG. 6) and connected via a CAN transceiver 16a to the CAN terminals CAN CH.2 of the microprocessor 15 of the additional controller. If a CAN message is detected on the "CP/PP" pair of lines from the CAN transceiver 16a of the additional controller, the functional connection of "CP" and "PP" to the charging manager is interrupted and the communication is set up with the external CHAdeMO-CCS adapter. Incoming CHAdeMO-CAN messages are forwarded directly by the central microcontroller 15 to the charging manager. Messages which are related to the state or a change in state of the CHAdeMO digital signals lead to activation of the corresponding optocoupler outputs OUT in the additional control by which the "status" signals in the external adapter is "reflected" or "targeted" into the vehicle.

Figure 7B:
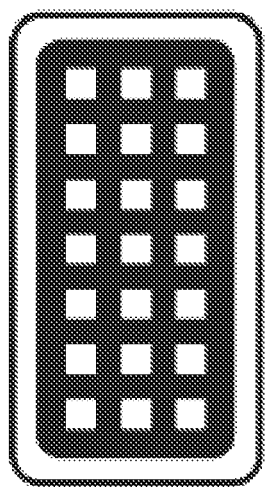
FIG. 7b shows the connections of the connector of the exemplary additional controller in a top view.
Figure 7A:
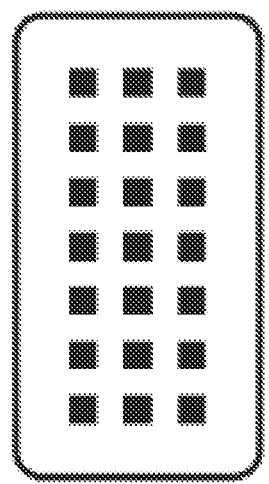
FIG. 7a shows the connections of the socket of the exemplary additional controller in a top view.

FIG. 7a shows the terminals of the socket of the exemplary additional controller in a top view. The socket of the additional controller corresponds to the socket of the charging manager so that the additional controller can be retrofitted in a simple and cost-effective manner without further technical changes at the electric vehicle or at the line trunk.

FIG. 7b shows the terminals of the connector of the exemplary additional controller in a top view. The connector of the additional controller corresponds to the connector with which the charging socket of the electric vehicle is connected to the charging manager so that the additional controller can be retrofitted in a simple and cost-effective manner without further technical changes at the electric vehicle or at the line trunk.

Figure 8A:
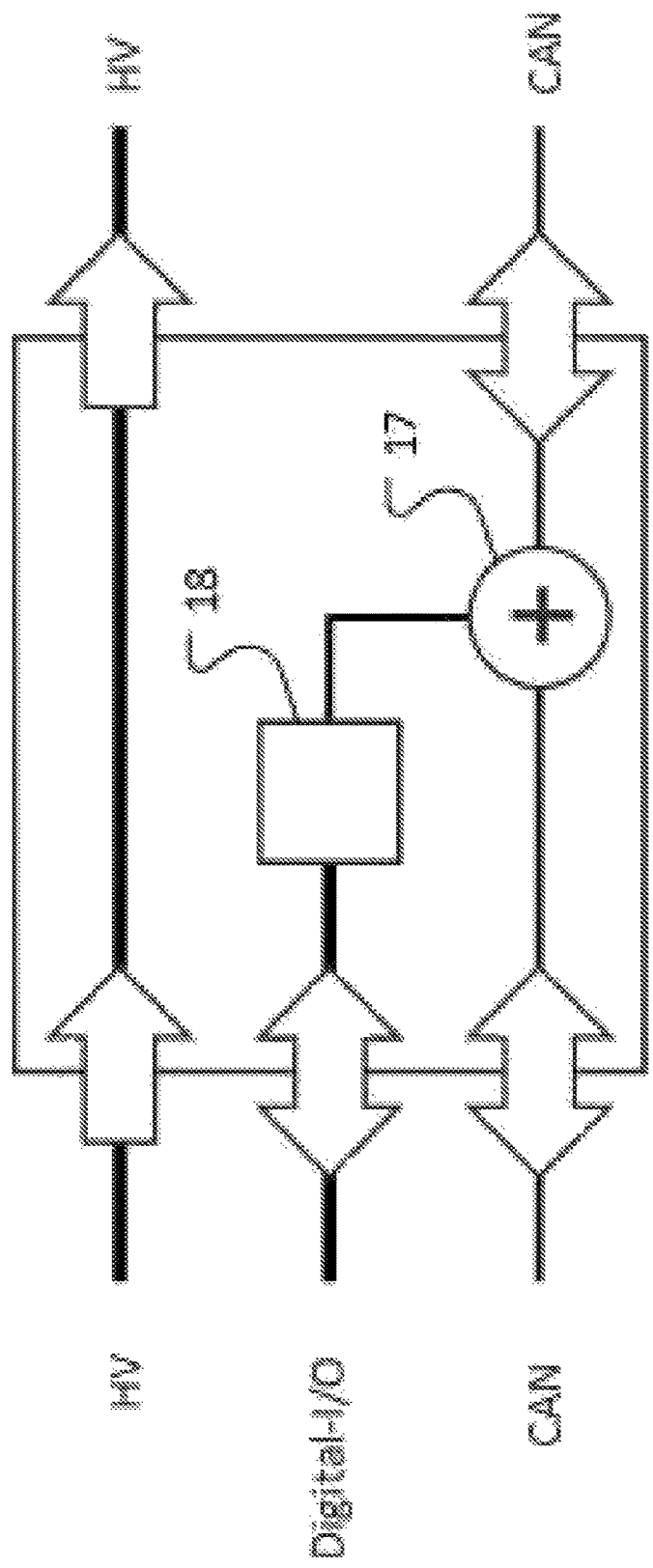
FIG. 8a shows a diagrammatic representation of the operation of a CHAdeMO-CCS adapter.

FIG. 8a shows a diagrammatic representation of the operation of a CHAdeMO-CCS adapter. The digital signal states Digital-I/O of a CHAdeMO charging station are embedded in a CAN message by a signal processing 18 via a multiplexer/demultiplexer 17 and forwarded via a CAN interface to an additional controller of an electric vehicle. Conversely, CAN messages with embedded digital signal states are read out by an additional controller of an electric vehicle from the multiplexer/demultiplexer 17 and provided by the signal processing 18 CHAdeMO—conformly as digital signal states Digital-I/O of the charging station.

Figure 8B:
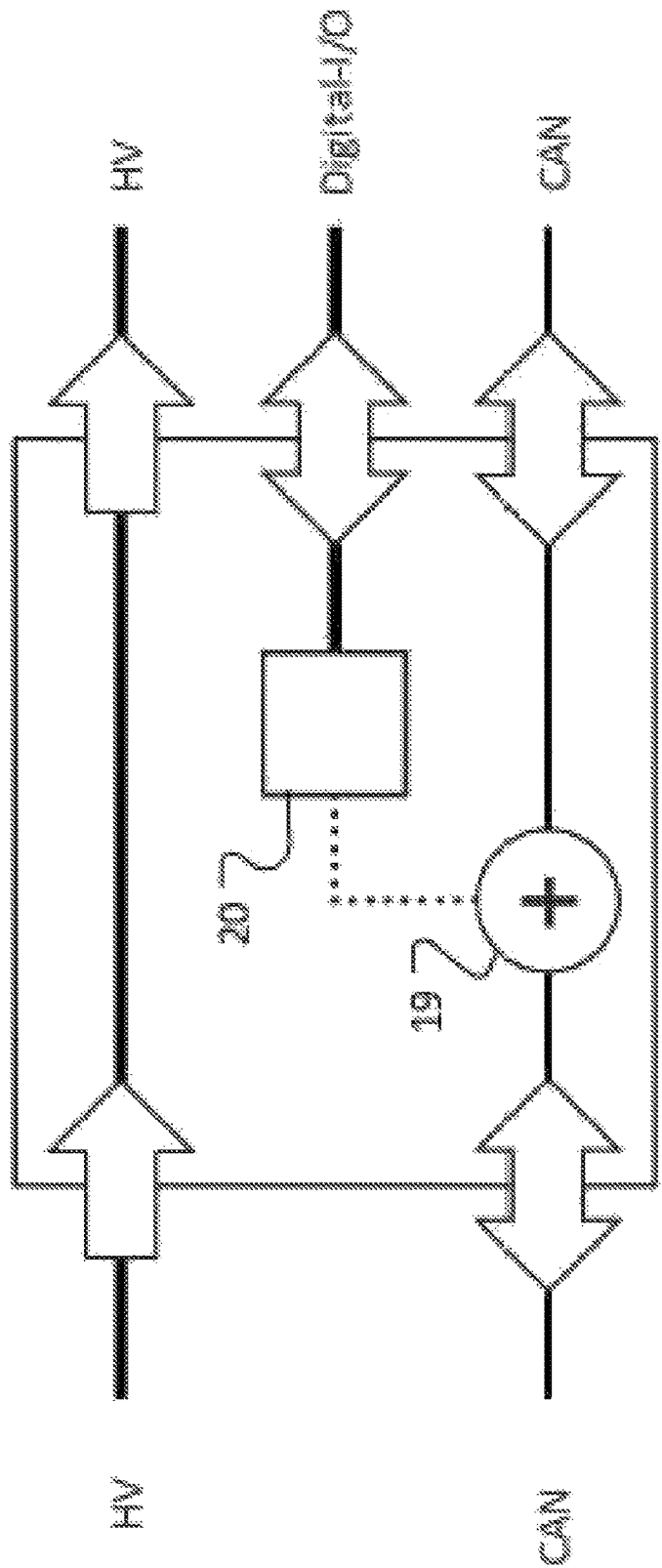
FIG. 8b shows a diagrammatic representation of the operation of an additional controller for a charging manager of an electric vehicle.

FIG. 8b shows a diagrammatic representation of the operation of an additional controller. The additional controller receives a CAN message generated by a CHAdeMO-CCS adapter with embedded digital signal states. A multiplexer/demultiplexer 19 reads out the digital signal states embedded in the CAN message and a signal processing 20 provides this as CHAdeMO-conformal signal states Digital-I/O to a charging manager of the electric vehicle. Conversely, digital signal states obtained from a charging manager are received by the signal processing 20 and embedded into a CAN message using multiplexer/demultiplexer 19 and transmitted by CAN to a CHAdeMO-CCS adapter.

Figure 9:
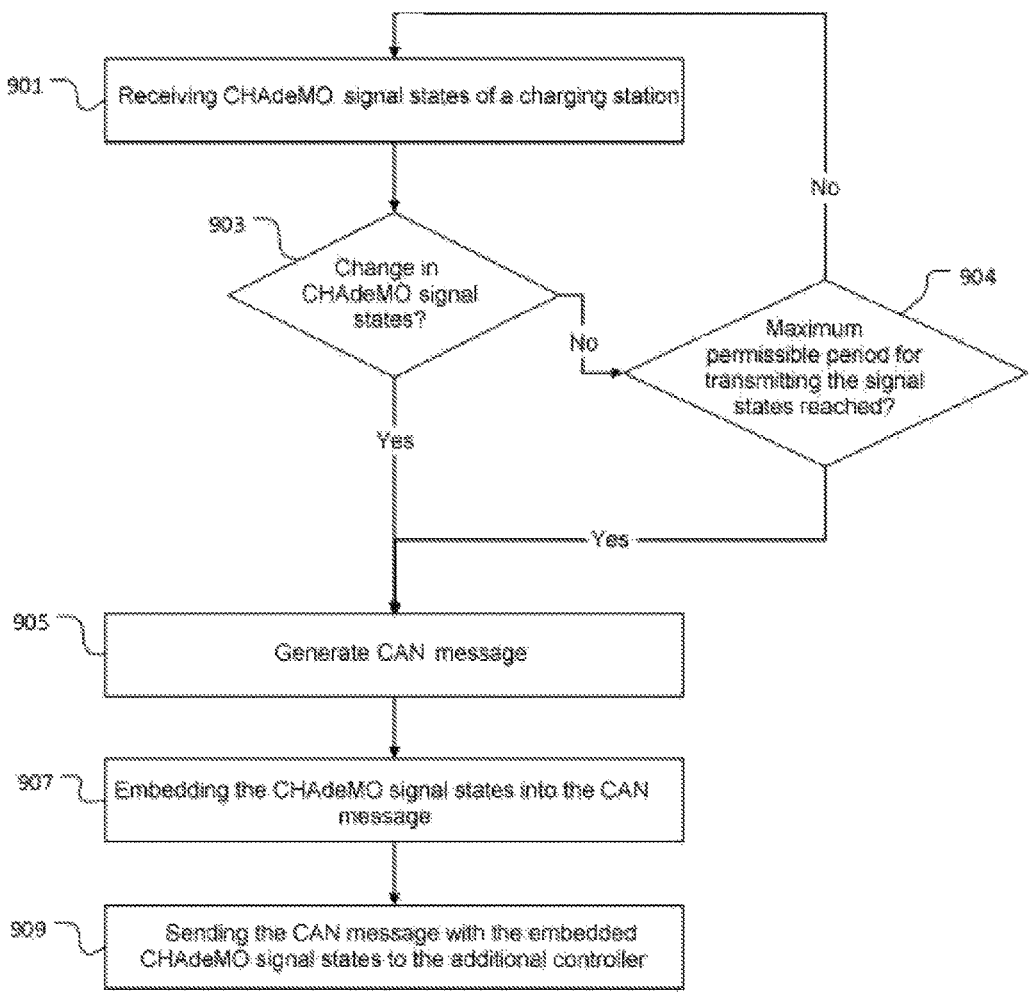
FIG. 9 diagrammatically shows an exemplary embodiment for a charging method in which signal states which are received via a CHAdeMO charging station are embedded into a CAN message and are forwarded, embedded in the CAN message, to an electric vehicle.

FIG. 9 diagrammatically shows an exemplary embodiment of a charging method in which signal states which are received from a CHAdeMO charging station are embedded into a CAN message and forwarded, embedded in the CAN message, to an electric vehicle. At 901, a circuit logic receives CHAdeMO signal states from a charging station. At 903, it is checked whether a change of the CHAdeMO signal states is present or not. If there is no change, the method continues with 904. At 904, it is checked whether the maximum permissible period of time for cyclic status transmission has already been reached. If this is not so, the method returns to 901. If there is a change in the CHAdeMO signal states or if the maximum permissible period of time has been reached, the method continues with 905. At 905, a CAN message is generated. At 907, the CHAdeMO signal states are embedded into the CAN message. At 909, the CAN message with the embedded CHAdeMO signal states is sent to an additional controller of a charging manager of an electric vehicle. In this manner, the CHAdeMO signal states are transmitted cyclically and in any case when there is a change in the CHAdeMO signal states.

LIST OF REFERENCE SYMBOLS

1 Electric vehicle
2 CHAdeMO charging station
3 CHAdeMO connector of the charging station
4 CHAdeMO socket of the electric vehicle
5 Charging manager
6 Energy management
7 CCS charging station
8 CCS connector of the charging station
9 CCS socket of the electric vehicle
10 CHAdeMO-CCS adapter
10a CHAdeMO socket of the adapter
10b CCS connector of the adapter
11 Additional controller
12 Microcontroller of the adapter
13 Power supply
14a,b CAN transceiver of the adapter
15 Microcontroller of the additional controller
16a,b CAN transceiver of the additional controller
17 Multiplexer/demultiplexer (adapter)
18 Signal processing (adapter)
19 Multiplexer/demultiplexer (additional controller)
20 Signal processing (additional controller)
HV+ Energy transmission+
HV− Energy transmission−
CAN-H Digital communication+
CAN-L Digital communication−
C-SS-1 Charger start/stop 1
C-SS-2 Charger start/stop 2
C-C Connection check
C-E/D Charging enabled/disabled
PE Protective Earth ("functional" protective earth)
PP Proximity Pilot ("connector detection")
CP Control Pilot (signaling of digital status information)

The invention claimed is:

1. An adapter comprising:
a CHAdeMO socket on an input side of the adapter for receiving a charging station connector of a CHAdeMO charging station;
a CCS connector on an output side of the adapter for connection to an electric vehicle; and
an electronic circuit logic which embeds signal states entering via the CHAdeMO socket into a CAN message and provides the embedded signal states as an output signal,
wherein the electronic circuit logic forwards a CAN message occurring in communication during a charging process from the CHAdeMO charging station or from a charging manager of the electric vehicle unchanged to a respective destination.

2. The adapter of claim 1, wherein the adapter sends the CAN message to an additional controller, connected in front of a charging manager in the electric vehicle.

3. The adapter of claim 1, wherein CCS lines, Control Pilot and Proximity Pilot, are used as CAN-HIGH and CAN-LOW for transmitting the CAN message to the electric vehicle and/or the HV supply voltage lines are directly connected through the adapter and/or a functional protective ground is connected through and used as a GND potential for the communication.

4. A controller connected between a CCS charging socket of an electric vehicle and a charging manager of the electric vehicle, the controller comprising:
a circuit logic which converts a CAN message received from a circuit logic of a CHAdeMO-CCS adapter into electrical signals and provides the electrical signals to the charging manager of the electric vehicle,
wherein the circuit logic forwards a CAN message occurring in communication during a charging process from a CHAdeMO charging station or from the charging manager of the electric vehicle unchanged to the respective destination.

5. The controller of claim 4, wherein the circuit logic converts the digital output signals of the charging manager into CAN messages and sends the CAN messages to a circuit logic of the CHAdeMO-CCS adapter.

6. The additional controller of claim 4, wherein the controller connects with the functional protective ground, Control Pilot and Proximity Pilot lines via a line trunk at the CCS charging socket of the electric vehicle.

7. A charging system comprising:
an adapter that includes a CHAdeMO socket on an input side of the adapter for receiving a charging station connector of a CHAdeMO charging station, a CCS connector on an output side of the adapter for connection to an electric vehicle, and an electronic circuit logic which embeds signal states entering via the CHAdeMO socket into a CAN message and provides the embedded signal states as an output signal; and an additional controller connected in front of a charging manager in the electric vehicle connected between a CCS charging socket of the electric vehicle and the charging manager of the electric vehicle, the additional controller including a circuit logic which converts a CAN message received from a circuit logic of a CHAdeMO-CCS adapter into electrical signals and provides the electrical signals to the charging manager of the electric vehicle, wherein the electronic circuit logic forwards a CAN message occurring in communication during a charging process from the CHAdeMO charging station or from a charging manager of the electric vehicle unchanged to a respective destination.

8. The charging system of claim 7, wherein the adapter sends the CAN message to an additional controller, connected in front of a charging manager in the electric vehicle.

9. The charging system of claim 7, wherein CCS lines, Control Pilot and Proximity Pilot, are used as CAN-HIGH and CAN-LOW for transmitting the CAN message to the electric vehicle and/or the HV supply voltage lines are directly connected through the adapter and/or a functional protective ground is connected through and used as a GND potential for the communication.

10. The charging system of claim 7, wherein the circuit logic converts the digital output signals of the charging manager into CAN messages and sends the CAN messages to a circuit logic of the CHAdeMO-CCS adapter.

11. The charging system of claim 7, wherein the circuit logic converts the digital output signals of the charging manager into CAN messages and sends the CAN messages to a circuit logic of the CHAdeMO-CCS adapter.

12. The charging system of claim 7, wherein the circuit logic forwards a CAN message occurring in communication during a charging process from a CHAdeMO charging station or from the charging manager of the electric vehicle unchanged to the respective destination.

13. The charging system of claim 7, wherein the additional controller connects with the functional protective ground, Control Pilot and Proximity Pilot lines via a line trunk at the CCS charging socket of the electric vehicle.

14. A charging method, the method comprising:

receiving signal states from a CHAdeMO charging station at an adapter that includes a CHAdeMO socket on an input side of the adapter for receiving a charging station connector of a CHAdeMO charging station, a CCS connector on an output side of the adapter for connection to an electric vehicle and an electronic circuit logic;

embedding the signal states entering via the CHAdeMO socket into a CAN message as an output signal; and forwarding the embedded signal states in the CAN message to the electric vehicle.

15. The charging method of claim 14, further comprising the adapter sending the CAN message to an additional controller, connected in front of a charging manager in the electric vehicle.

16. The method of claim 14, wherein CCS lines, Control Pilot and Proximity Pilot, are used as CAN-HIGH and CAN-LOW for transmitting the CAN message to the electric vehicle and/or the HV supply voltage lines are directly connected through the adapter and/or a functional protective ground is connected through and used as a GND potential for the communication.

17. The method of claim 14, wherein the circuit logic converts the digital output signals of the charging manager into CAN messages and sends the CAN messages to a circuit logic of the CHAdeMO-CCS adapter.

18. The method of claim 14, wherein the circuit logic converts the digital output signals of the charging manager into CAN messages and sends the CAN messages to a circuit logic of the CHAdeMO-CCS adapter.

19. The method of claim 14, wherein the circuit logic forwards a CAN message occurring in communication during a charging process from a CHAdeMO charging station or from the charging manager of the electric vehicle unchanged to the respective destination.

20. The method of claim 14, wherein the additional controller connects with the functional protective ground, Control Pilot and Proximity Pilot lines via a line trunk at the CCS charging socket of the electric vehicle.

* * * * *